United States Patent [19]

Nakajima et al.

[11] 3,960,648

[45] June 1, 1976

[54] METHOD FOR TREATING PULP-CONTAINING WASTE LIQUORS

[75] Inventors: Mikio Nakajima, Fujisawa; Kiyoaki Kuwabara, Yokohama, both of Japan

[73] Assignee: Nippon Carbide Kogyo Kabushiki Kaisha, Tokyo, Japan

[22] Filed: Feb. 7, 1975

[21] Appl. No.: 548,073

[30] Foreign Application Priority Data

Feb. 13, 1974    Japan................... 49-16763

[52] U.S. Cl.................... 162/29; 162/190; 210/53
[51] Int. Cl.²......................... D21F 1/82
[58] Field of Search............ 162/166, 190, 29; 210/52, 53, 54

[56] References Cited
UNITED STATES PATENTS

| | | | |
|---|---|---|---|
| 3,484,837 | 12/1969 | Odom et al. | 210/52 |
| 3,617,570 | 11/1971 | Redmore | 210/54 |
| 3,637,491 | 1/1972 | Hedrick et a. | 210/54 |

FOREIGN PATENTS OR APPLICATIONS

| | | | |
|---|---|---|---|
| 1,080,383 | 8/1967 | United Kingdom | 210/54 |

*Primary Examiner*—S. Leon Bashore
*Assistant Examiner*—William F. Smith
*Attorney, Agent, or Firm*—Sherman & Shalloway

[57] ABSTRACT

A process for treating a pulp-containing waste liquor which comprises adding a flocculating agent to the pulp-containing waste liquor and separating and removing the resulting flocculated matter, characterized in that about 1 to about 50 parts by weight, per 1000 parts by weight of the turbid components in said waste liquor, of a dicyandiamideformaldehyde resin is admixed with the waste liquor, and then aluminum sulfate is added to the mixture.

8 Claims, 1 Drawing Figure

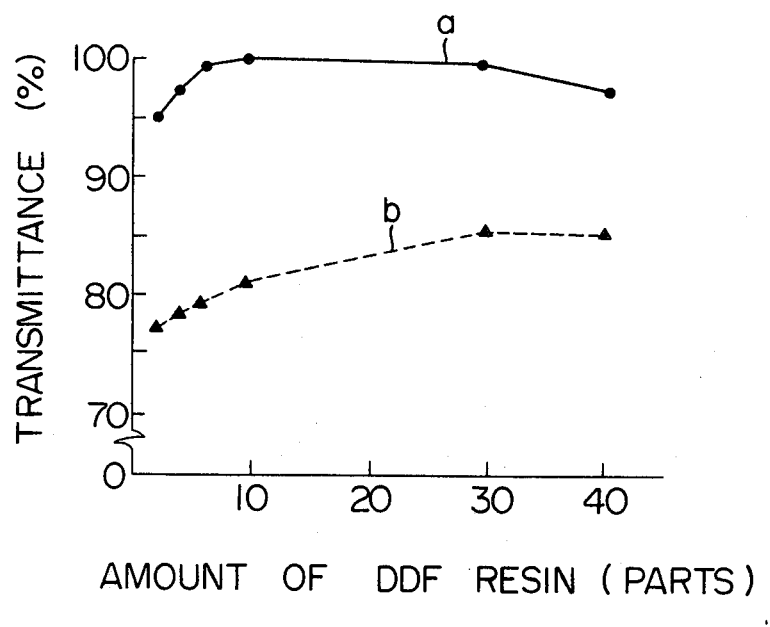

METHOD FOR TREATING PULP-CONTAINING WASTE LIQUORS

This invention relates to a method for treating pulp-containing waste liquors discharged from various steps of the paper-making and the pulp-manufacturing industries, etc. by which the turbid components of the waste liquors are removed to clarify the liquors.

More specifically, this invention relates to a method for treating pulp-containing waste liquors by which the clarification of the waste liquors can be achieved with reduced amounts of a treating agent or flocculating agent and with a simple operation at a saved cost. Especially, it relates to a method for treating pulp-containing waste liquors by adding a flocculating agent thereto and separating and removing the resulting flocculated matter, characterized in that about 1 to about 50 parts by weight of a dicyandiamide-formaldehyde resin, per 1000 parts by weight of the turbid components of the waste liquor, is admixed with the waste liquor, and then aluminum sulfate is added to the mixture.

The "turbid component," as used in the present application, denotes the dried solid residue which remains after evaporating the liquid component of a pulp-containing waste liquor, and which generically refers to organic and inorganic components causing the turbidity of the waste liquor. These components are mostly contained as a suspended or colloidal matter, but are partly dissolved, in the waste liquor.

In order to remove turbid components of industrial waste water, it has been the practice to flocculate them with a flocculating agent, for example, inorganic metal salts such as aluminum sulfate, polyaluminum chloride or ferric chloride, or cationic, nonionic or anionic organic polymers, and to separate and remove the flocculated matter.

The inorganic metal salts have been used chiefly as chemicals for use in clarifying pulp-containing waste liquors discharged in the pulp- and paper-making industries, but since very strict legislative restrictions are imposed on the discharge of industrial wastes with a view to preventing environmental pollution, these metal salts cannot give sufficient effects.

On the other hand, it is known to utilize a dicyandiamide-formaldehyde resin as a flocculating agent (Japanese Patent Publication No. 23231/61). However, under presently strict waste discharge regulations, the use of this resin alone as a flocculating agent, in the restricted amount as specified in the present invention, cannot provide a satisfactory clarifying effect in the treatment of pulp-containing waste liquors. This will be shown later by a comparative example.

We therefore furthered our studies on the conjoint use of the inorganic metal salts and the dicyandiamide-formaldehyde resin. We firstly followed the commonly known teaching that (1) an inorganic metal salt (which is cheap) is first used in a relatively large amount, (2) after removing the resulting flocculated matter, the remaining components are removed by (3) using an organic polymeric flocculating agent (which is relatively costly). Therefore, we treated a pulp-containing waste liquor firstly with aluminum sulfate and then with a dicyandiamide-formaldehyde resin. However, as shown later in a comparative example, no satisfactory effect of clarifying the liquor could be achieved. When both of these are added at the same time, the results are also unsatisfactory, as will be shown later by a comparative example.

Accordingly, we reversed the order of addition, contrary to the commonly known teaching, and added aluminum sulfate after bringing the dicyandiamide-formaldehyde resin into full contact with the turbid components of the waste liquor. As a result, we unexpectedly found that a greater clarifying effect can be achieved with a markedly lesser amount of the dicyandiamide-formaldehyde resin.

By contrast, when a commercially available cationic modified polyacrylamide-type flocculating agent which has come into wide use as a preferred flocculating agent is used together with aluminum sulfate in treating a pulp-containing waste liquor, a satisfactory high degree of clarifying effect cannot be obtained irrespective of the order of addition, as will be shown later by a comparative example.

We have thus confirmed that the above unexpected fact is a unique phenomenon appearing only with a combination of the dicyandiamide-formaldehyde resin and aluminum sulfate in the treatment of pulp-containing waste liquors.

Accordingly, it is an object of this invention to provide a method for treating pulp-containing waste liquors by which an improved clarification of the waste liquors can be achieved at a low cost with reduced amounts of a dicyandiamide-formaldehyde resin flocculating agent and an inorganic metal salt.

Other objects and advantages of this invention will become more apparent from the following description.

The dicyandiamide-formaldehyde resin utilized in the method of this invention is known, and can be prepared, for example, by dissolving about 1 mol of dicyandiamide in about 1 mol of hydrochloric acid, reacting the solution gradually, while maintaining the reaction mixture at about 90° to 100°C., adding about 2 mols of formaldehyde, and reacting them with stirring at a temperature of about 4 to about 6 hours, preferably about 5 hours.

The resulting dicyandiamide-formaldehyde resin is used in an amount of about 1 to about 50 parts by weight, preferably about 1.5 to about 40 parts by weight, and more preferably about 2 to about 35 parts by weight, per 1,000 parts by weight of the turbid components in the pulp-containing waste liquor. If the amount of the resin is too small, the flocculating effect is not sufficient, and on the other hand, if it is excessive, the resin acts as a dispersant or a protective colloid for the turbid components, and thus tends to produce a reduced flocculating effect.

Aluminum sulfate to be added subsequently is used in an amount of at least about 100 parts by weight, preferably about 100 to about 400 parts by weight, based on 1000 parts by weight of the turbid components in the waste liquor.

In order to ensure a flocculating effect, it is desirable to adjust the pH of the pulp-containing waste liquor to an acid pH, preferably about 3 to about 5. Thus, pH adjustment should be made as required.

In treating a pulp-containing waste liquor, the dicyandiamide-formaldehyde resin is first added to the waste liquor and mixed with it uniformly, and then, aluminum sulfate is added. Any desired means can be used in mixing, such as a mechanical stirring means, or a non-mechanical means such as flow mixing.

Removal of the flocculated matter obtained during the treatment of the pulp-containing waste liquor can be effected by separating the sedimented and/or floating matter by filtration or other optional solid-liquid separating operations.

According to this invention, the degree of clarity of the waste water so treated shows a marked increase over the method comprising firstly adding aluminum sulfate and then adding the dicyandiamide-formaldehyde resin, and moreover, sufficient effects can be obtained with small amounts of the chemicals. The process of this invention can be performed with a simple operation, and can contribute to the curtailment of the cost of treating waste liquors.

The following Examples and Comparative Examples illustrate the process of this invention in greater detail. In the following examples, all parts are by weight unless otherwise specified.

EXAMPLE 1 AND COMPARATIVE EXAMPLES 1 AND 2

A dicyandiamide-formaldehyde resin (to be sometimes abbreviated as a DDF resin) was added to 300ml. of a Kraft pulp waste liquor (the concentration of the turbid components which will sometimes be referred to hereinafter as a solid component or solid content was 500 ppm; adjusted to pH 4) in an amount of 6 parts per 1,000 parts of the solid content of the waste liquor. The mixture was stirred by a jar tester at 150 rpm for 5 minutes. Then, 200 parts, per 1,000 parts of the solid content of the liquor, of aluminum sulfate was further added, and the mixture was stirred at 50 rpm for 5 minutes.

The mixture was filtered at reduced pressure, and the filtrate was examined for the transmittance of light of wavelength 380 nm. The transmittance was found to be 99.9%. visual observation of the treated liquor showed that it was as transparent as city water.

For comparison, the above procedure was repeated except that the amount of the dicyandiamide-formaldehyde resin added was changed to 0.7 part and 55 parts respectively (Comparative Examples 1 and 2). In either case, the transmittance was 75%, and the filtrate was turbid when observed visually.

The results are shown in Table 1.

EXAMPLE 2 AND COMPARATIVE EXAMPLES 3, 4 AND 5

The procedure of Example 1 was repeated except that the amount of the DDF resin was changed as shown in Table 2. The results are shown in Table 2. Run No. 3 in Table 2 refers to the results of Example 1. In all runs, the waste liquors treated were transparent when observed visually.

For comparison, the procedure of Example 2 was repeated except that the order of adding the DDF resin and aluminum sulfate was reversed (Comparative Example 3). The results are also shown in Table 2. In Comparative Example 3, the best result was obtained in Run No. 5 in which the transmittance was 85.3%. In all runs, the waste liquors treated were turbid when observed visually.

For further comparison, the procedure of Example 2 was repeated except that a commercially available cationic modified polyacrylamide-type flocculating agent (to be abbreviated as a PAA resin) was used instead of the DDF resin (Comparative Example 4). Further, Comparative Example 3 was repeated except that the PAA resin was used instead of the DDF resin (Comparative Example 5). The results obtained are also shown in Table 2. The best transmittance obtained in these Comparative Examples was about 80%, and the waste liquors treated were evidently turbid when observed visually.

The results of Comparative Example 3 and Example 2 were plotted in the accompanying drawing. In the drawing, the solid line $a$ refers to the results of Example 2, and the dotted line $b$, to the results of Comparative Example 3. It is clearer from the results shown in this drawing that a markedly high clarifying effect can be achieved with a reduced amount of the resin by the process of this invention.

EXAMPLE 3 AND COMPARATIVE EXAMPLES 6 TO 8

A dicyandiamide-formaldehyde resin was added to 300 ml. of a Kraft pulp waste liquor (the solid concentration 500 ppm; adjusted to pH 4) in an amount of 30 parts per 1000 parts of the solid content of the waste liquor, and the mixture was stirred at 150 rpm for 5 minutes. Then, 400 parts, per 1000 parts of the solid content of the waste liquor, of aluminum sulfate was added, and the mixture was stirred at 50 rpm for 5 minutes. The mixture was filtered at reduced pressure, and the filtrate was examined for the transmittance of light of wavelength 380 nm. The transmittance was found to be 99.6%.

The same procedure as above was repeated except that the amount of aluminum sulfate was changed to 100 parts and 200 parts respectively, and the transmittance of each of the filtrates obtained was measured. The results are shown in Table 3.

For comparison, the procedure of Example 3 above was repeated except that the order of adding the DDF resin and aluminum sulfate was reversed (Comparative Example 6). The results are shown in Table 3. In Comparative Example 6, the highest transmittance was 85.3% in Run No. 2 which gave the best result. In all runs, the waste liquors treated were turbid when observed visually.

For further comparison, Example 3 was repeated except that a commercially available cationic modified polyacrylamide flocculating agent was used instead of the DDF resin (Comparative Example 7). Comparative Example 7 was repeated except that the order of adding the resin and aluminum sulfate was reversed (Comparative Example 8). The results are shown in Table 3. Even in Run No. 2, which gave the best result, the transmittance was below 80%. The waste liquors treated in these runs were noticeably turbid when observed visually.

COMPARATIVE EXAMPLES 9 AND 10

Run No. 4 of Example 2 was repeated except that 10 parts of the DDF resin and 200 parts of aluminum sulfate were added at the same time (Comparative Example 9). Furthermore, Run No. 4 was repeated except that the aluminum sulfate was not used (Comparative Example 10).

The results are shown in Table 4 together with the results of Run No. 4 of Example 2.

We claim:
1. A process for flocculating and removing turbid components of pulp-containing waste liquor from paper-making processes comprising:
A. adjusting the pH of the waste liquor so that it has an acid pH; then

B. adding and mixing from about 1 to about 50 parts by weight per 1,000 parts by weight of turbid components in the waste liquor of a dicyandiamide-formaldehyde resin with the waste liquor; and then C. adding and mixing at least about 100 parts by weight per 1,000 parts by weight of turbid components in the waste liquor of aluminum sulfate whereby the turbid components of the waste liquor are flocculated; and then D. separating and removing the resultant flocculated material.

2. The process of claim 1 wherein the pH of the waste liquor is adjusted to from about 3 to about 5.

3. The process of claim 1 in which the pH is adjusted to about 4.

4. The process of claim 1 wherein from about 1.5 to about 40 parts of the resin are added.

5. The process of claim 1 wherein from about 2 to about 35 parts of the resin are added.

6. The process of claim 1 wherein about 6 to about 30 parts of the resin are added.

7. The process of claim 1 wherein the aluminum sulfate is present in up to about 400 parts.

8. The process of claim 1 wherein at least about 200 parts of aluminum sulfate are added.

* * * * *